US012163538B1

(12) United States Patent
Wang et al.

(10) Patent No.: US 12,163,538 B1
(45) Date of Patent: Dec. 10, 2024

(54) PNEUMATIC CYLINDER

(71) Applicant: Easytork Automation Corporation, Saint Louis, MO (US)

(72) Inventors: George Wang, Saint Louis, MO (US); James Wang, Taichung (TW); Yu Da Chuang, Taichung (TW); Peng-Lin Lu, Taichung (TW)

(73) Assignee: Easytork Automation Corporation, Saint Louis, MO (US)

( * ) Notice: Subject to any disclaimer, the term of this patent is extended or adjusted under 35 U.S.C. 154(b) by 0 days.

(21) Appl. No.: 18/345,390

(22) Filed: Jun. 30, 2023

(51) Int. Cl.
*F15B 15/12* (2006.01)
*F15B 15/20* (2006.01)

(52) U.S. Cl.
CPC ............ *F15B 15/12* (2013.01); *F15B 15/202* (2013.01); *F15B 2215/30* (2013.01)

(58) Field of Classification Search
CPC ..... F15B 15/12; F15B 15/202; F15B 2215/30
See application file for complete search history.

(56) References Cited

U.S. PATENT DOCUMENTS 3,752,041 A * 8/1973 Smith .................... F15B 20/002 91/416
4,009,644 A * 3/1977 Higuchi .................. F01C 9/002 92/125
7,419,134 B2 * 9/2008 Gruel .................... F16K 31/105 251/30.01
8,573,558 B2 * 11/2013 Wang ...................... F15B 15/12 251/27
2002/0152886 A1 * 10/2002 Sawdon ................ F15B 15/228 92/120
2015/0060707 A1 * 3/2015 Baasch ..................... F16K 1/22 251/59
2018/0258963 A1 * 9/2018 Carl ........................ F15B 15/12
2019/0352967 A1 * 11/2019 Shu .......................... F01D 17/16

* cited by examiner

*Primary Examiner* — Kenneth Bomberg
*Assistant Examiner* — Matthew Wiblin

(57) ABSTRACT

A pneumatic cylinder comprises a housing comprising a hollow body including a first part, a second part, an upper first compartment, and a lower second compartment, an upper cover including a first through hole, a lower cover including a second through hole, and an activation chamber in the hollow body; a rotor in the activation chamber and including a blade rotatably secured to a drive shaft, the blade having unequal first and second sections; and two first openings on two sides of the housing respectively.

6 Claims, 14 Drawing Sheets

PNEUMATIC CYLINDER

BACKGROUND OF THE INVENTION

1. Field of the Invention

The invention relates to mechanical devices and more particularly to a pneumatic cylinder.

2. Description of Related Art

Conventionally, a pneumatic cylinder comprises a hollow body, an upper cover disposed on a top of the hollow body, and a lower cover disposed on a bottom of the hollow body. A space is formed in the hollow body for allowing a rotor to rotate. Further, an electromagnetic valve is used to control the flow of gas, thereby allowing gas to enter the hollow body or exiting gas out of the hollow body. Shapes and sizes of the upper and lower covers are required to correspond to shapes and sizes of the different hollow bodies. This in turn can complicate the manufacturing processes and increase the manufacturing cost.

Thus, the need for improvement still exists.

SUMMARY OF THE INVENTION

It is therefore one object of the invention to provide a pneumatic cylinder, characterized by comprising a housing comprising a hollow body, an upper cover, and a lower cover, the hollow body including a first part having a fan-shaped cross-section, a second part having a half circular section, a first compartment on an upper portion, and a second compartment on a lower portion, the first compartment and the second compartment communicating with each other and having the same shape, the upper cover and the lower cover being disposed on the first compartment and the second compartment respectively, thereby forming an activation chamber in the hollow body, the activation chamber including a first activation space in the first part and a second activation space in the second part, the first activation space communicating with the second activation space, the upper cover including a first through hole, and the lower cover including a second through hole aligned with the first through hole; a rotor disposed in the activation chamber and including a drive shaft having two ends rotatably disposed in the first through hole and the second through hole respectively, and a blade secured to the drive shaft, the blade being configured to rotate about the drive shaft in the activation chamber, the drive shaft being configured to divide the blade into a first section and a second section having a length less than a length of the first section so that the first and second sections are not symmetrical by the division of the drive shaft, the first section is configured to rotate in the first activation space, the second section is configured to rotate in the second activation space, and a plurality of segments are formed on an inner surface of the hollow body along an axial direction of the drive shaft and the segments have the same shape and size; and two first openings disposed on two sides of the housing respectively so that pressurized gas is configured to pass through one of the first openings into the hollow body to clockwise or counterclockwise rotate the blade about the drive shaft prior to exiting from the other first opening.

By utilizing the invention, for increasing space of the housing, only length of the hollow body is changed and shapes and sizes of the upper and lower covers are not changed, production is made easy, and manufacturing cost is decreased. Further, the invention is applicable to either fail-safe cylinder (FSC) or double-acting cylinder (DAC).

The above and other objects, features and advantages of the invention will become apparent from the following detailed description taken with the accompanying drawings.

DETAILED DESCRIPTION OF THE INVENTION

Figure 1:
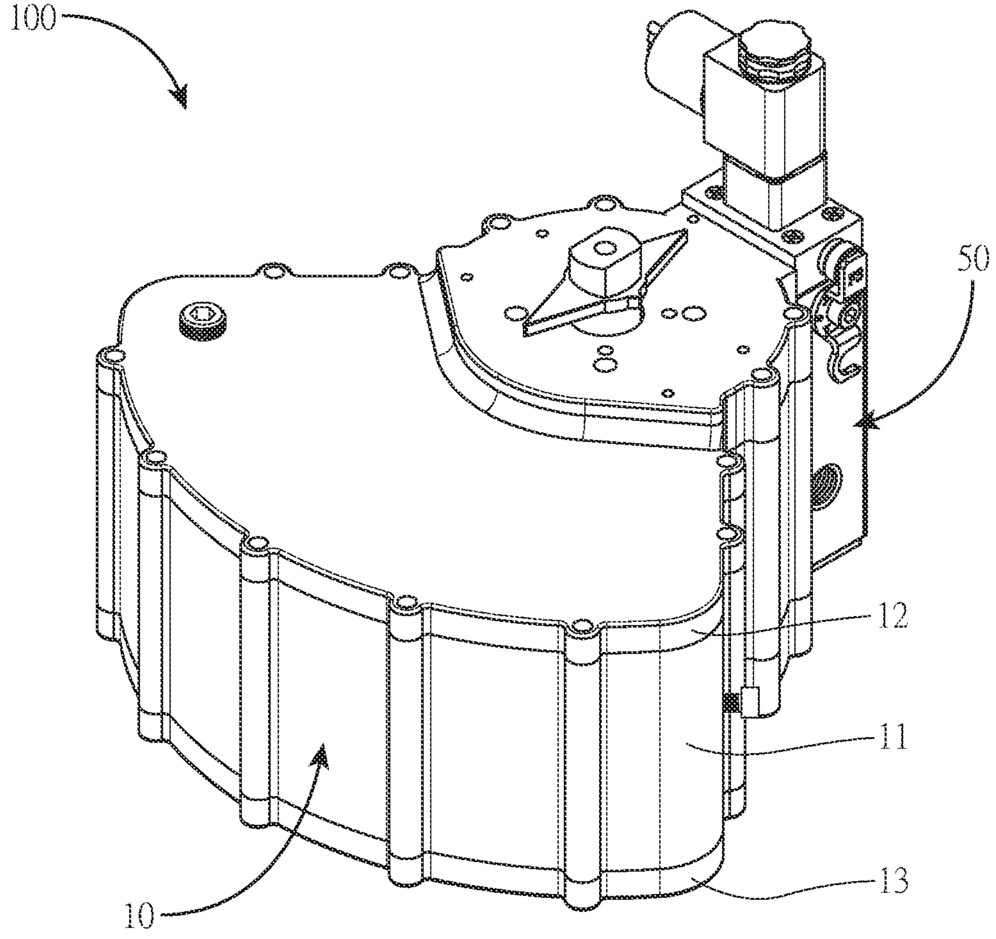
FIG. 1 is a perspective view of a pneumatic cylinder according to a first preferred embodiment of the invention.
Figure 2:
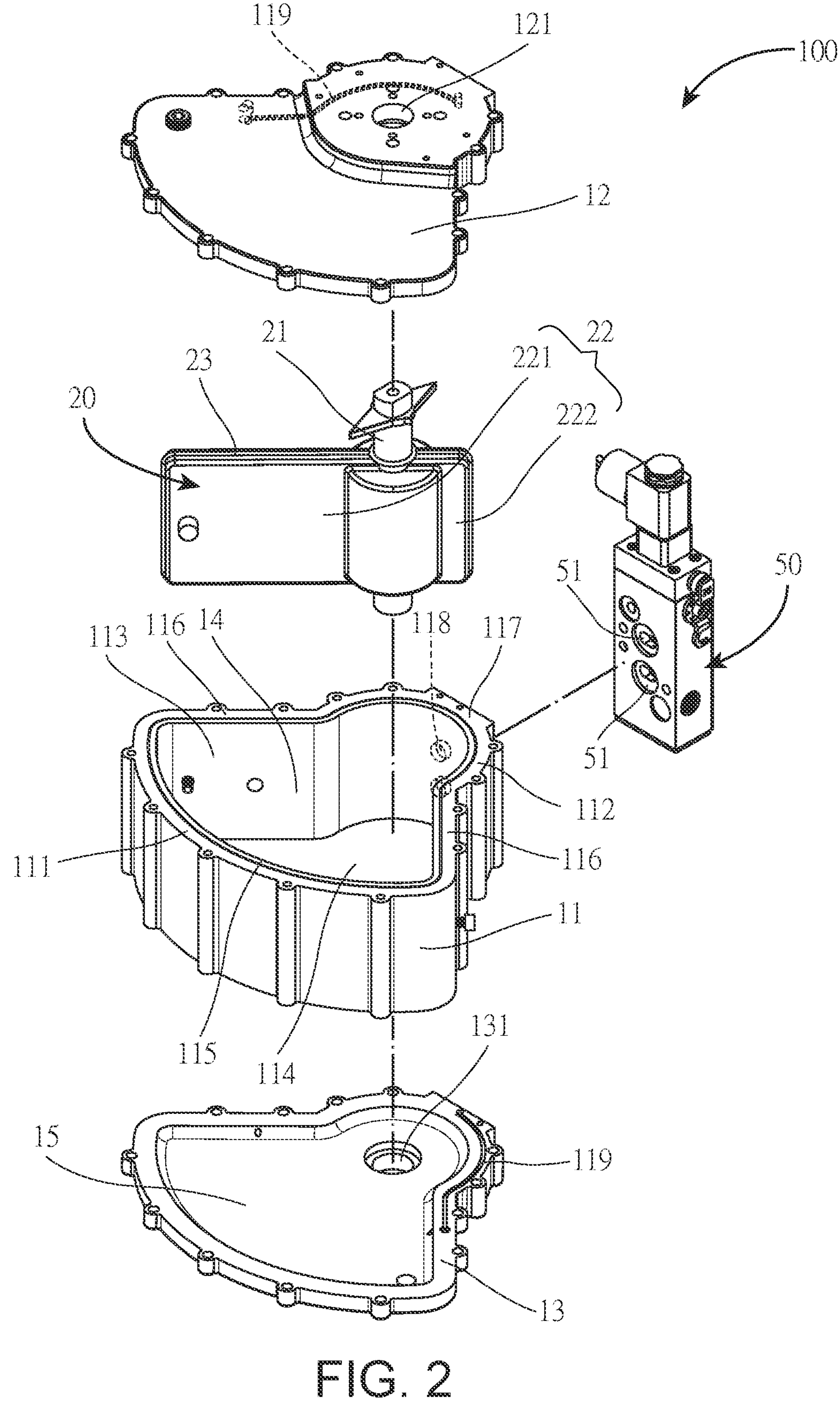
FIG. 2 is an exploded view of the pneumatic cylinder.

Referring to FIGS. 1 to 12, a pneumatic cylinder 100 in accordance with a first preferred embodiment of the invention comprises the following components as discussed in detail below.

A housing 10 comprises a hollow body 11, an upper cover 12 and a lower cover 13. The hollow body 11 includes a first part 111 having a fan-shaped cross-section and a second part 112 having a half circular section formed with the first part 111. Inside of the hollow body 11 are provided with a first compartment 113 on an upper portion and a second compartment 114 on a lower portion. The first and second compartments 113, 114 communicate with each other and have the same shape. The upper cover 12 and the lower cover 13 are shaped corresponding to a shape of the hollow body 11. The upper cover 12 and the lower cover 13 are disposed on the first compartment 113 and the second compartment 114 respectively, thereby forming an activation chamber 14 in the hollow body 11. The activation chamber 14 includes a first activation space 141 in the first part 111 and a second activation space 142 in the second part 112. The first activation space 141 communicates with the second activation space 142. A first hole 121 is formed through the upper cover 12 and a second hole 131 is formed through the lower cover 13. The first hole 121 is aligned with the second hole 131.

The first part 111 includes a first arc surface 115 and two side surfaces 116 integrally formed at two ends of the first arc surface 115 respectively. The second part 112 includes a second arc surface 117 having a width less than that of the first arc surface 115. The first arc surface 115 is opposite to the second arc surface 117 and the first and second arc surfaces 115, 117 are convex.

Figure 3:
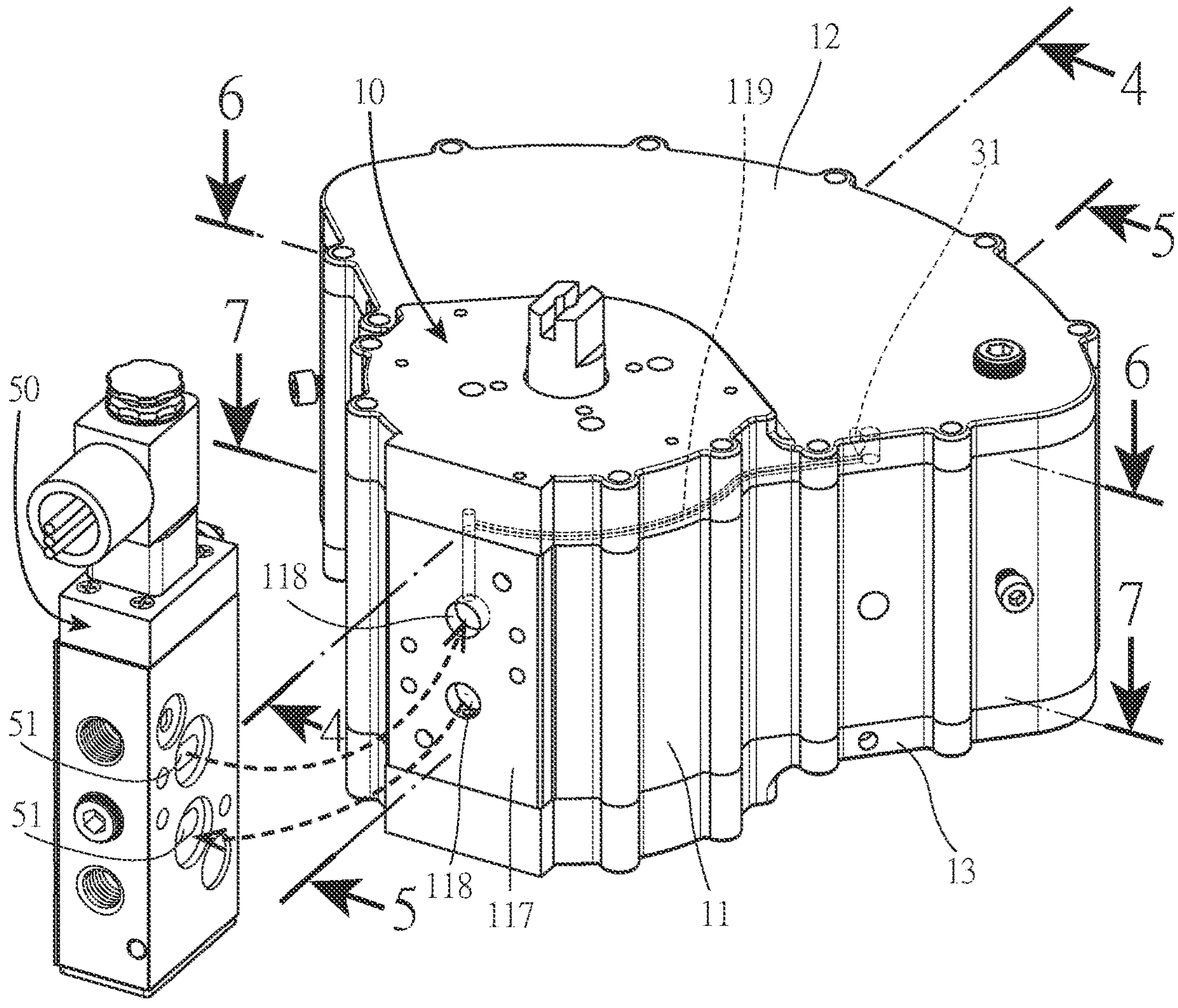
FIG. 3 is a perspective, exploded view of the pneumatic cylinder showing the electromagnetic valve separated from the housing and communication between the first openings and the opening members.
Figure 4:
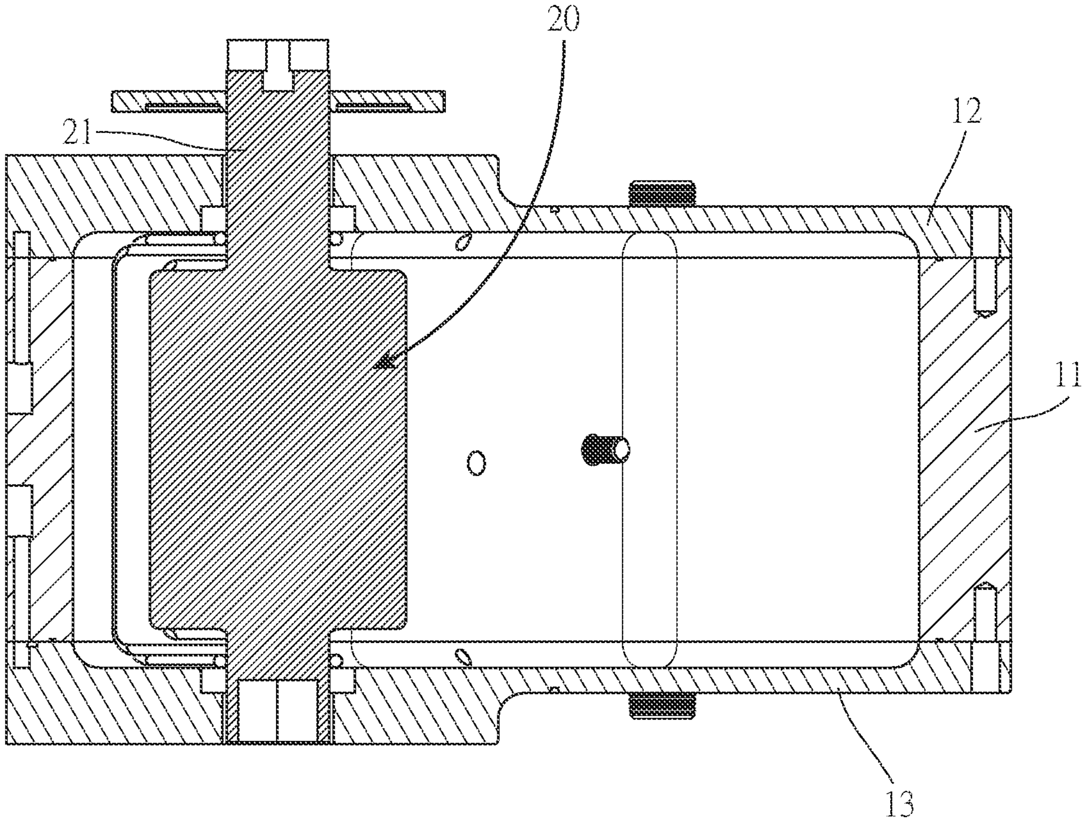
FIG. 4 is a sectional view taken from line 4-4 to line 5-5 in FIG. 3.
Figure 5:
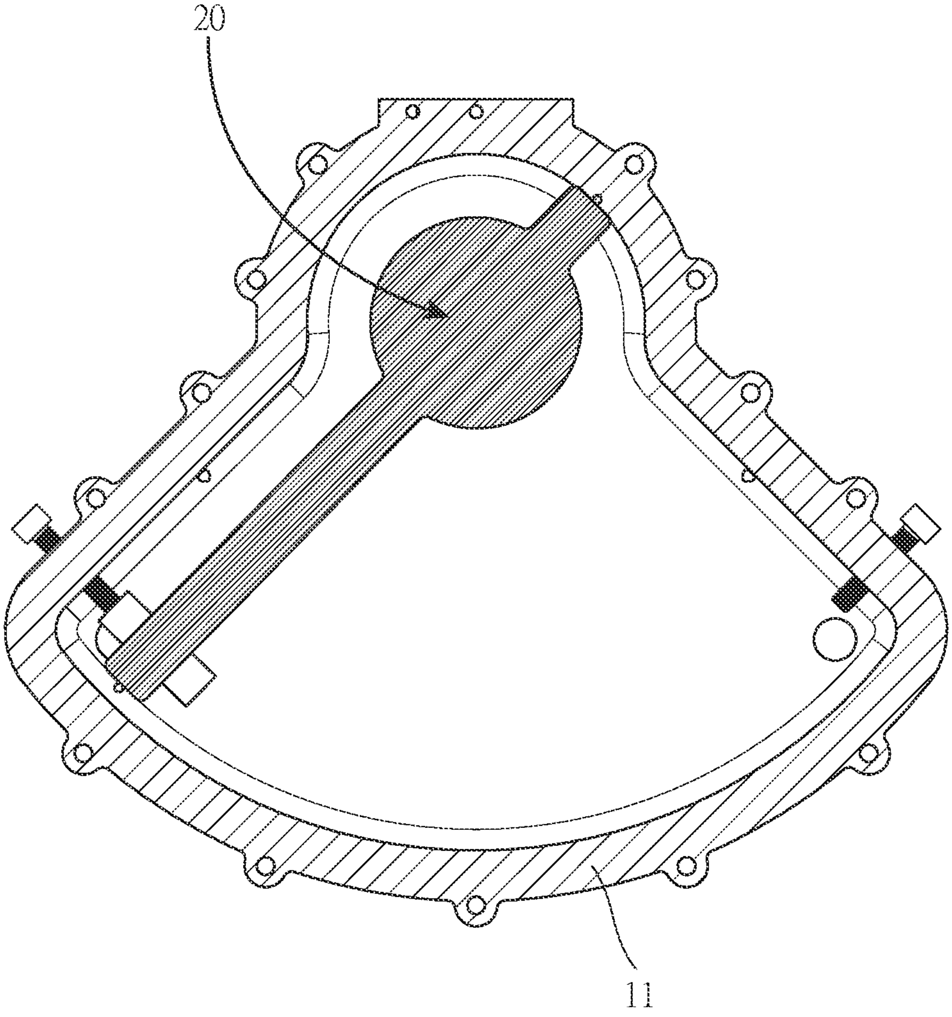
FIG. 5 is a sectional view taken from line 6-6 to line 7-7 in FIG. 3.
Figure 6:
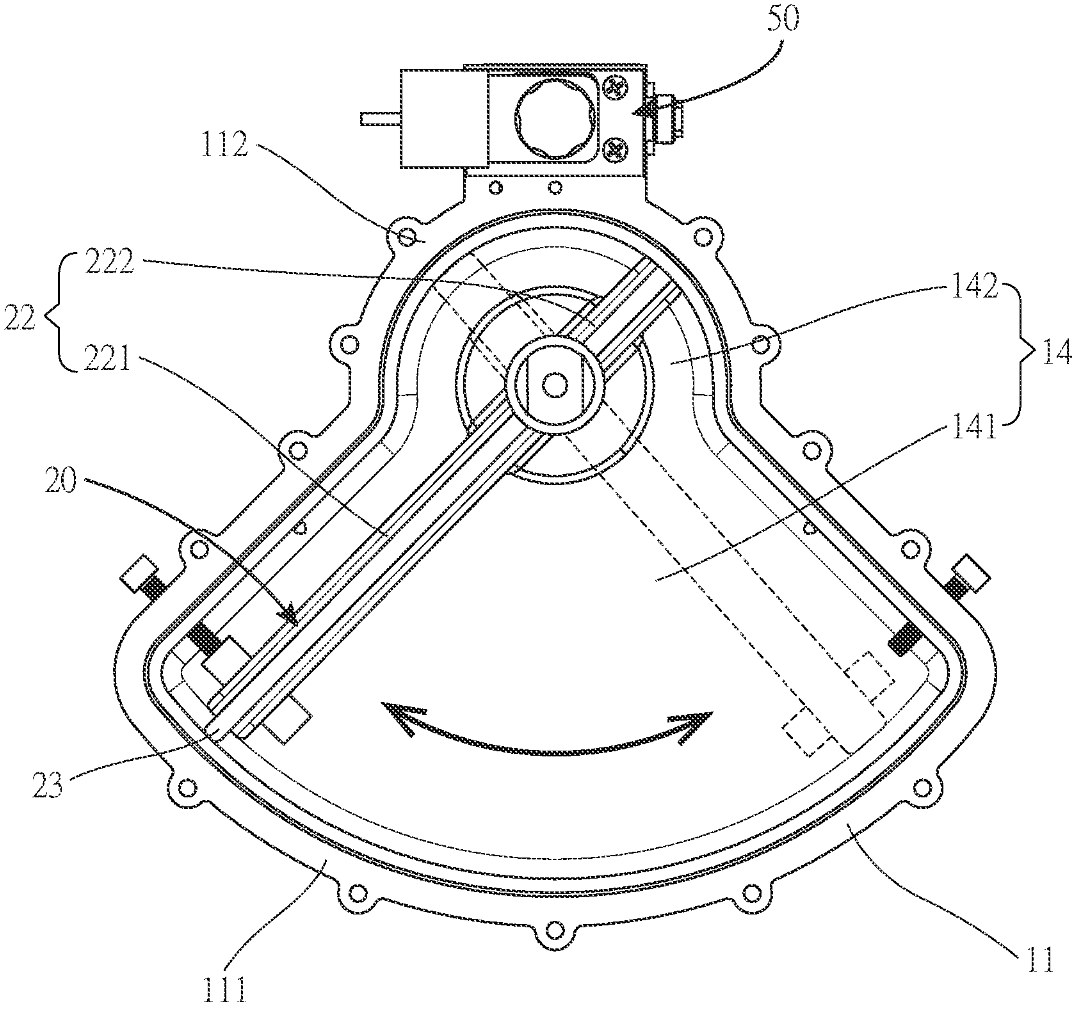
FIG. 6 is a top view of the pneumatic cylinder with the upper cover removed to show rotation of the rotor.
Figure 7:
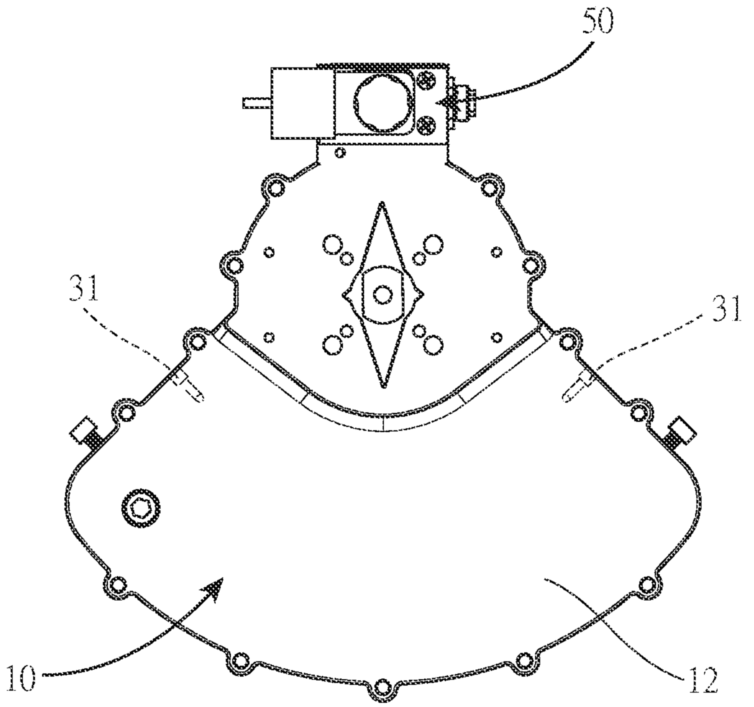
FIG. 7 is a top view of the pneumatic cylinder showing locations of the first openings disposed on the hollow body.
Figure 8:
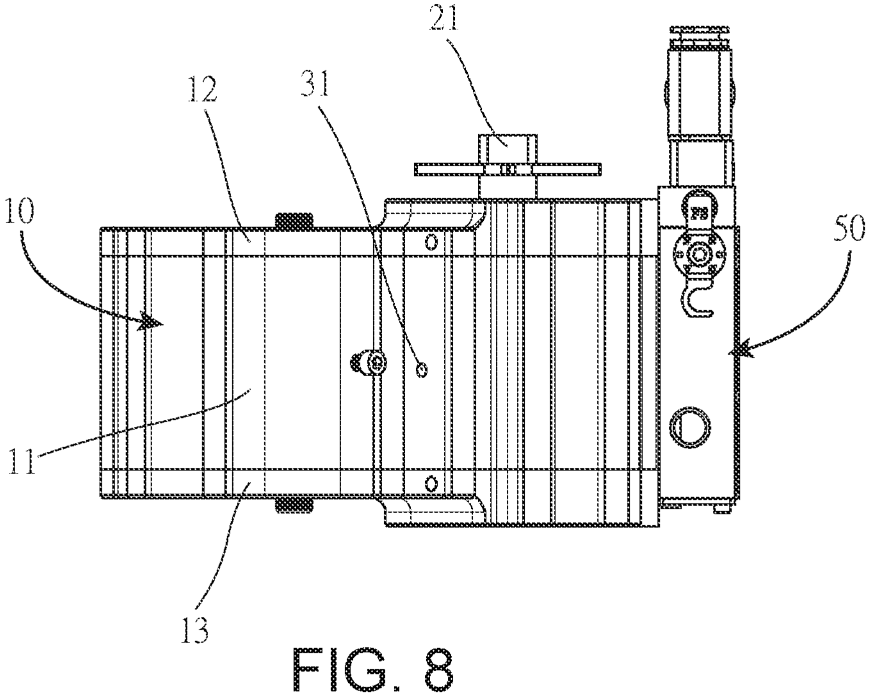
FIG. 8 is a side elevation of the pneumatic cylinder showing locations of the first openings disposed on the hollow body.
Figure 9:
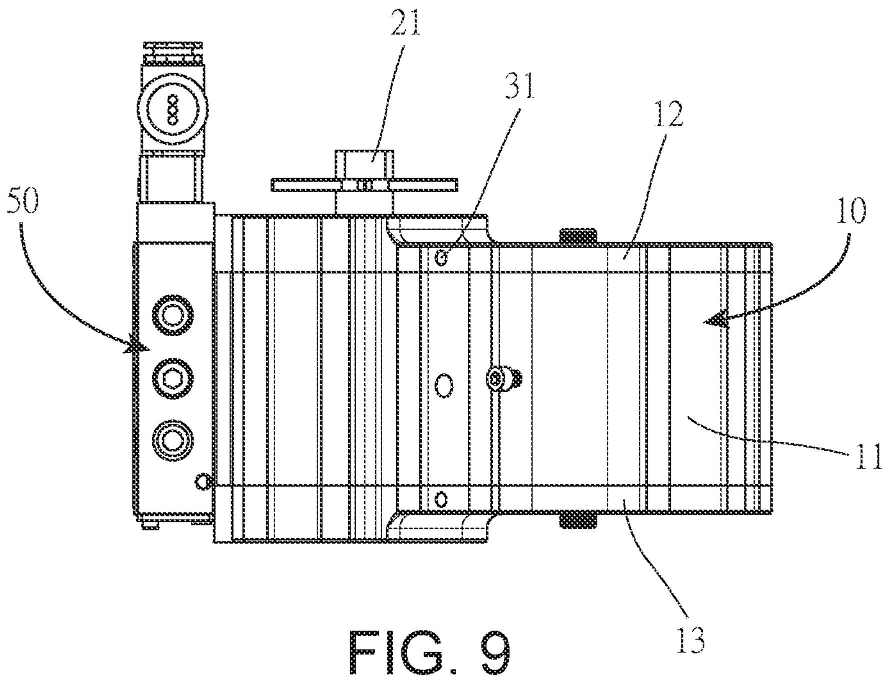
FIG. 9 is a left side view of the pneumatic cylinder showing locations of the first openings disposed on sides of the upper and lower covers.
Figure 10:
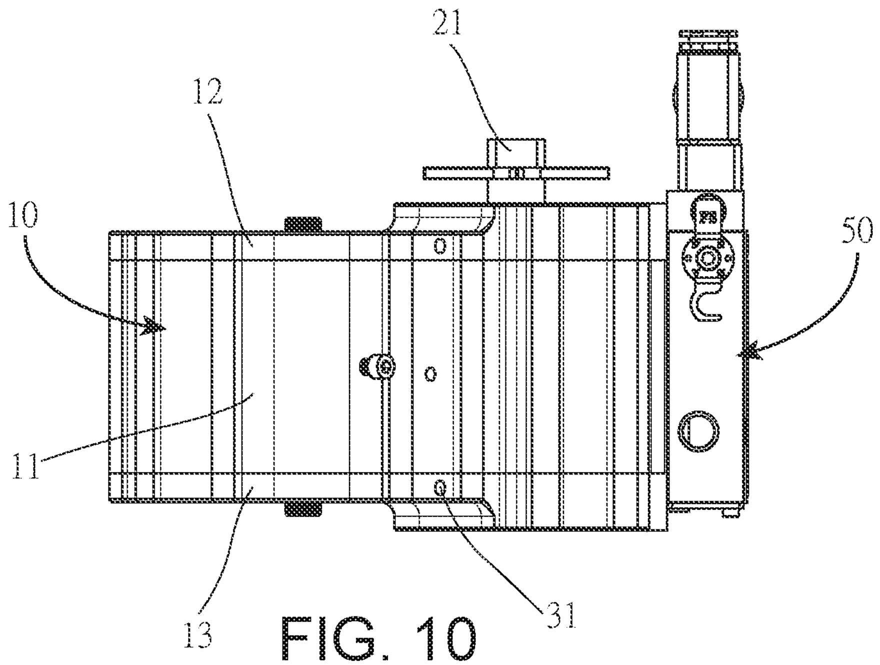
FIG. 10 is a right side view of the pneumatic cylinder showing locations of the first openings disposed on the sides of the upper and lower covers.
Figure 11:
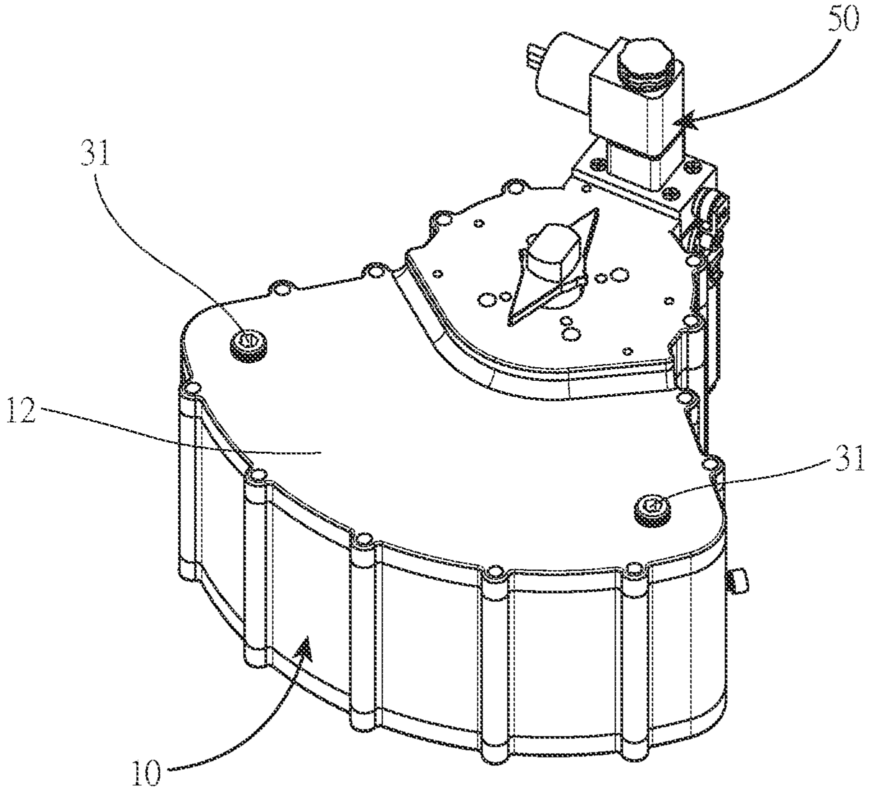
FIG. 11 is a perspective view of the pneumatic cylinder showing locations of the first openings disposed on a top of the upper cover.
Figure 12:
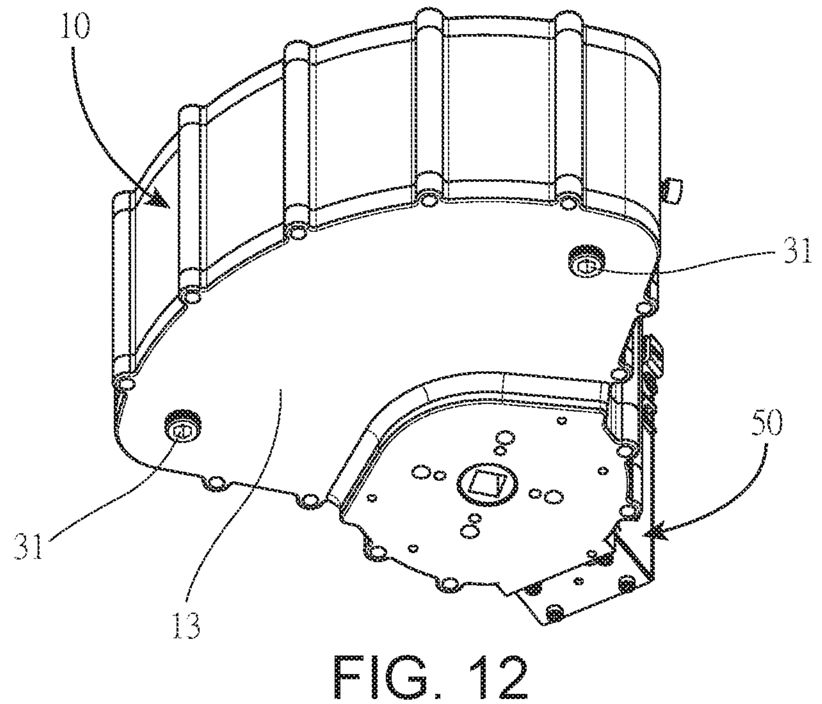
FIG. 12 is another perspective view of the pneumatic cylinder showing locations of the first openings disposed on a bottom of the lower cover.

A rotor 20 is disposed in the activation chamber 14 and may rotate an angle between 30-degree and 180-degree in the activation chamber 14. The rotor 20 includes a drive shaft 21 and a blade 22. Two ends of the drive shaft 21 are rotatably disposed in the first hole 121 and the second hole 131 respectively. The blade 22 is secured to the drive shaft 21. The blade 22 rotates about the drive shaft 21 in the activation chamber 14. The drive shaft 21 divides the blade 22 into a first section 221 and a second section 222 having a length less than that of the first section 221. That is, the first and second sections 221, 222 are not symmetrical by the division of the drive shaft 21. The first section 221 may rotate in the first activation space 141 and the second section 222 may rotate in the second activation space 142. A seal 23 is provided around the blade 22 to prevent pressurized gas from leaking. A flat surface 15 is provided on a bottom of the upper cover 12 and another flat surface 15 is provided on a top of the lower cover 13 respectively. The flat surfaces 15 correspond to the rotor 20. As shown in FIG. 4 specifically, a plurality of segments are formed on an inner surface of the hollow body 11 along an axial direction of the drive shaft 21 from line 4-4 to line 5-5 in FIG. 3 and the segments have the same shape and size. As shown in FIG. 5 specifically, a plurality of segments are formed on an inner surface of the hollow body 11 along the axial direction of the drive shaft 21 from line 6-6 to line 7-7 in FIG. 3 and the segments have the same shape and size.

Two first openings 31 are provided on two sides of the housing 10 respectively. Specifically, the first openings 31 are provided on two sides of the hollow body 11 respectively (see FIGS. 7 and 8). Alternatively, the first openings 31 are provided on one side of the upper cover 12 and one side of the lower cover 13 respectively (see FIGS. 9 and 10). Alternatively, the first openings 31 are provided on a top of the upper cover 12 proximate two sides (see FIG. 11) and the first openings 31 are provided on a bottom of the lower cover 13 proximate two sides (see FIG. 12). Thus, pressurized gas may pass through one of the first openings 31 into the hollow body 11 to clockwise or counterclockwise rotate the blade 22 about the drive shaft 21 prior to exiting from the other first opening 31. As shown in FIG. 3 specifically, two opening members 118 are provided on the second arc surface 117 of the second part 112. When the first openings 31 are provided on two sides of the upper cover 12 and the lower cover 13 respectively, one of the opening members 118 may communicate with one of the first openings 31 via one of two channels 119 and the other opening member 118 may communicate with the other first opening 31 via the other one of the channels 119 respectively, and the first openings 31 are blocked from communicating with the external.

Figure 13:
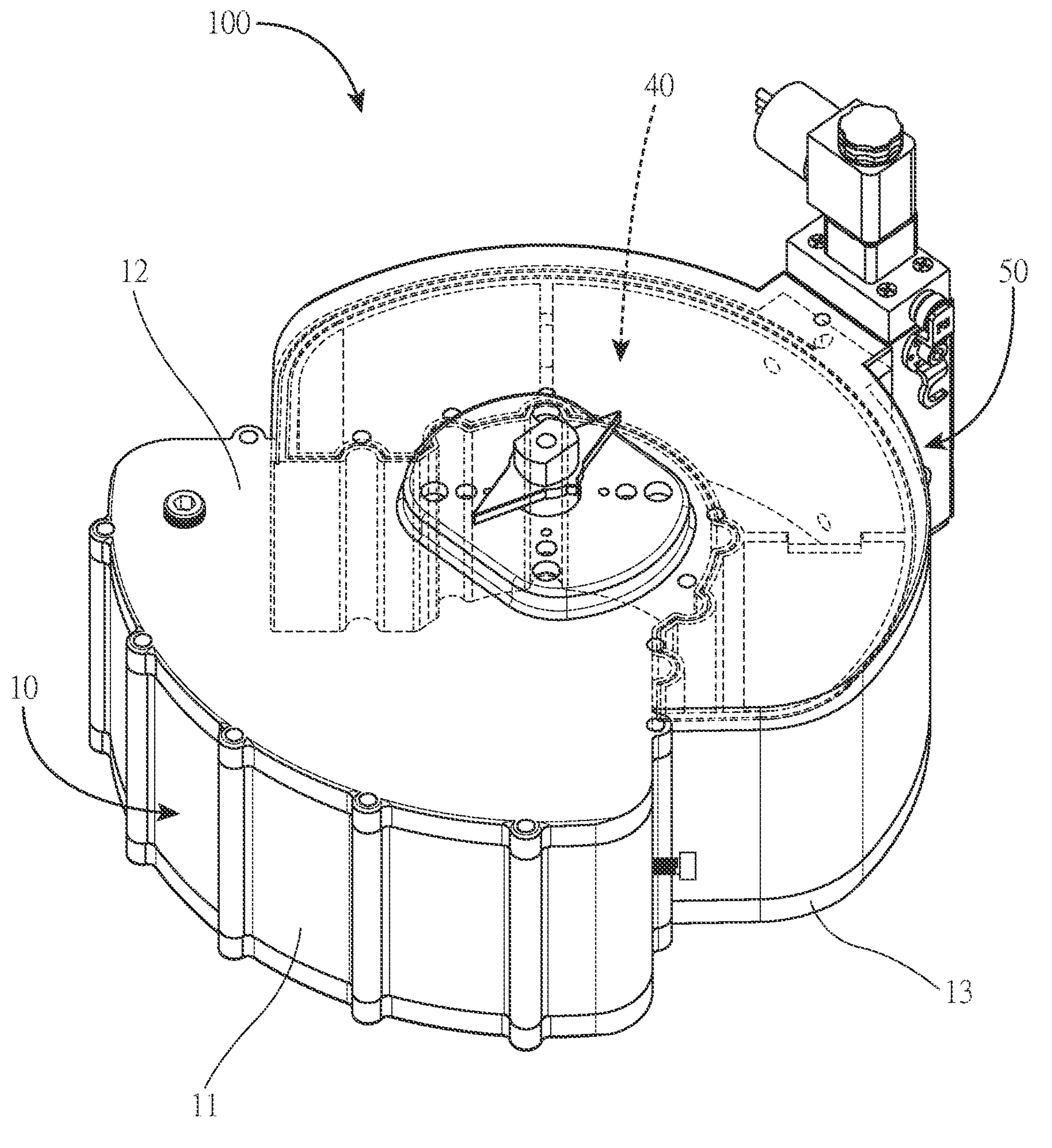
FIG. 13 is a perspective view of a pneumatic cylinder according to a second preferred embodiment of the invention, showing a gas compartment disposed at an end of the housing.
Figure 14:
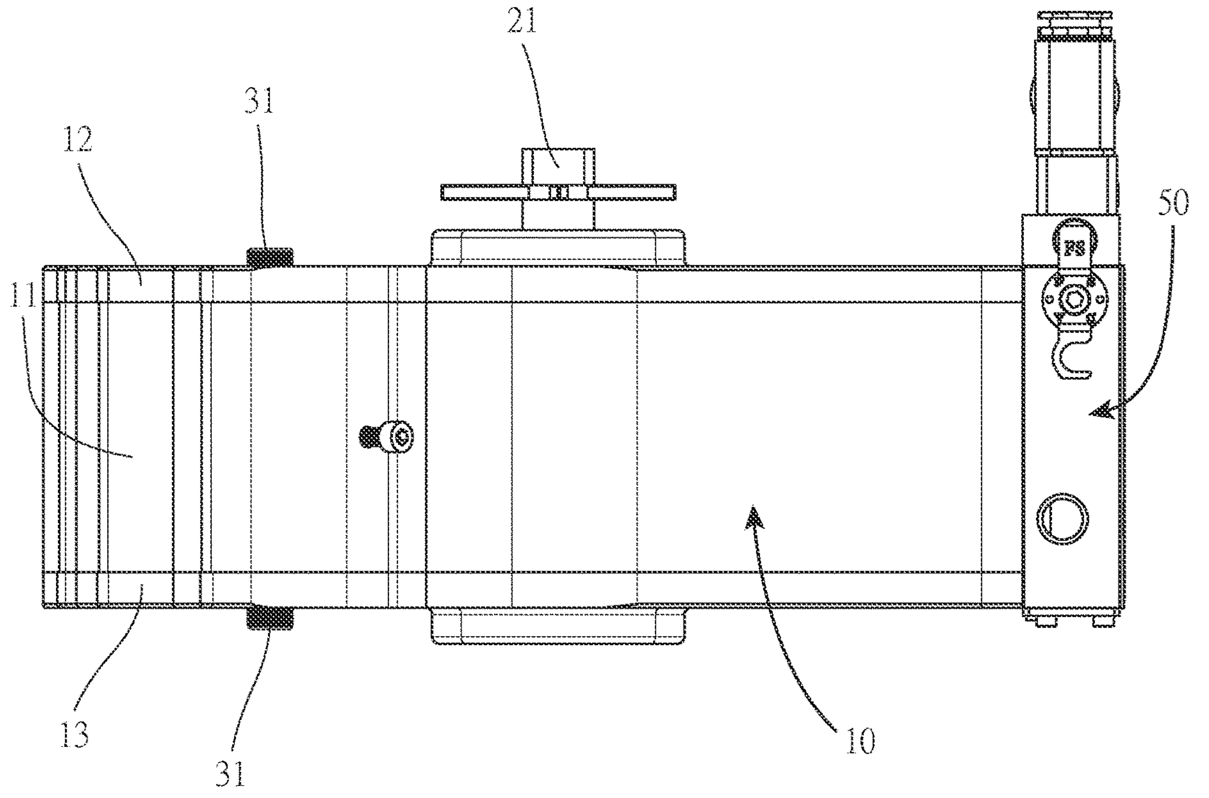
FIG. 14 is a side elevation of the pneumatic cylinder in FIG. 13.
Figure 15:
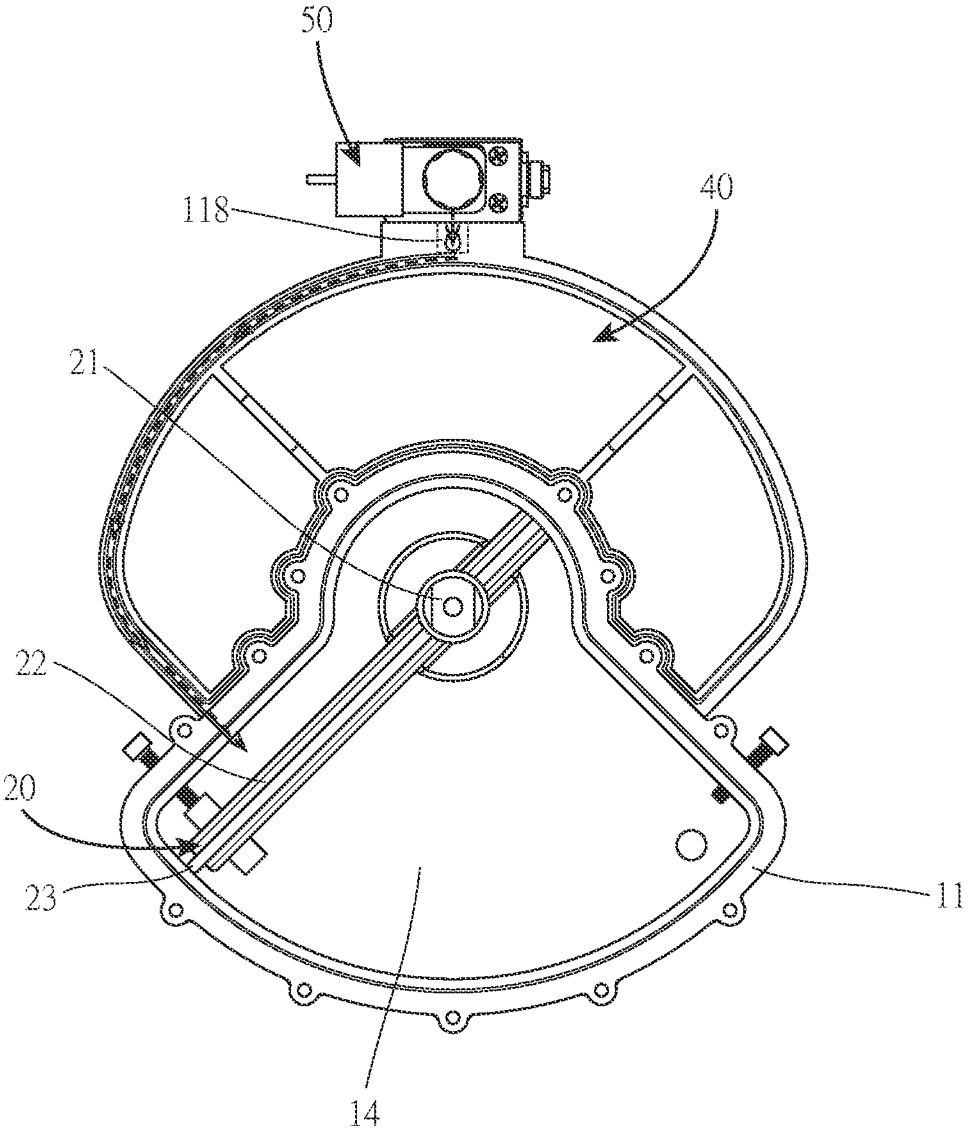
FIG. 15 is a top view of the pneumatic cylinder of FIG. 13 with the upper cover removed showing its operation.

Referring to FIGS. 13 to 15, a pneumatic cylinder in accordance with a second preferred embodiment of the invention is shown. The characteristics of the second preferred embodiment are substantially the same as that of the first preferred embodiment except the following: a gas compartment 40 can be connected to the housing 10 and communicates therewith. In the second embodiment, the gas compartment 40 is integrally connected to a side of the housing 10. The first openings 31 are provided on a top of the upper cover 12 and a bottom of the lower cover 13 respectively. Pressurized gas may enter one of the first openings 31 to clockwise or counterclockwise rotate the blade 22 about the drive shaft 21 prior to exiting from the other first opening 31. After finishing the gas input, the pressurized gas in the gas compartment 40 may exert a reaction force on the blade 22 to push the blade 22 to its original position.

Figure 16:
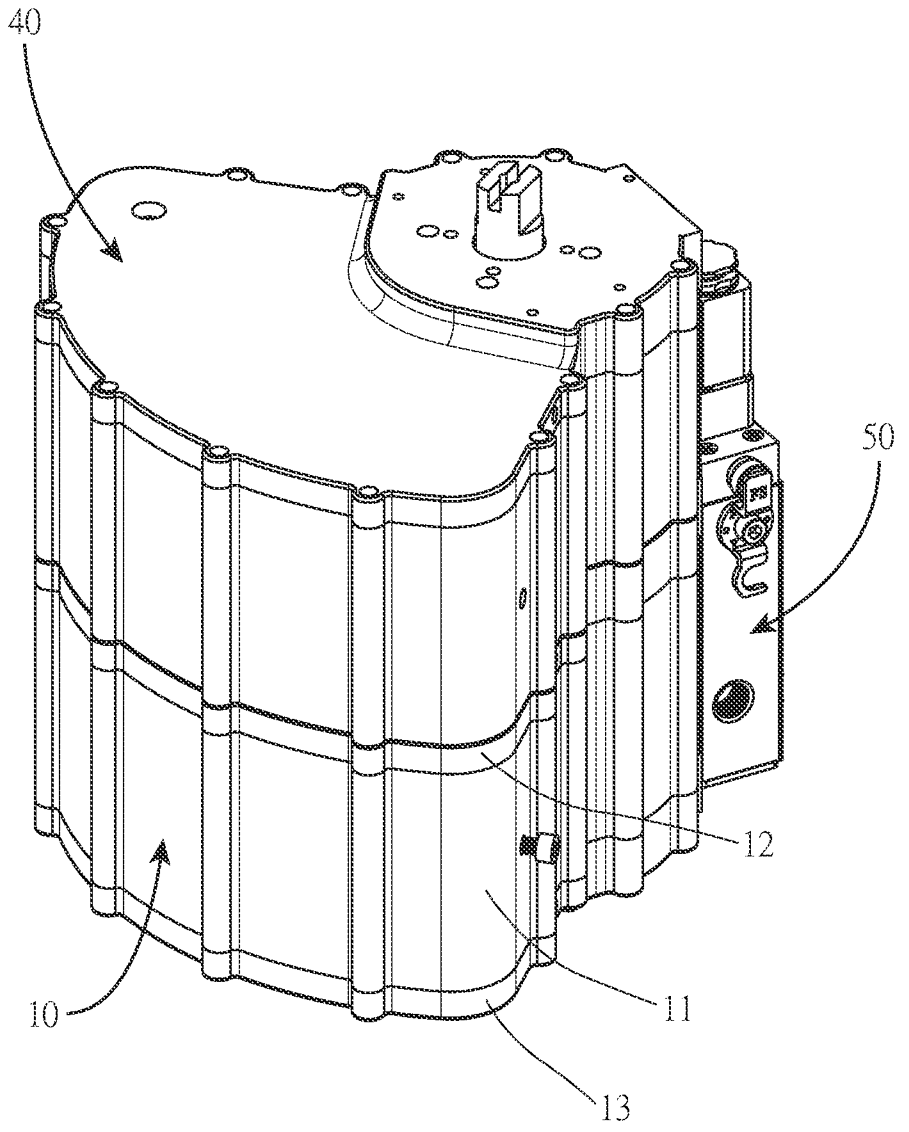
FIG. 16 is a perspective view of a pneumatic cylinder according to a third preferred embodiment of the invention, showing the gas compartment disposed on a top of the upper cover of the housing.

Referring to FIG. 16, a pneumatic cylinder in accordance with a third preferred embodiment of the invention is shown. The characteristics of the third preferred embodiment are substantially the same as that of the second preferred embodiment except the following: the gas compartment 40 is provided on a top of the upper cover 12. The gas compartment 40 communicates with the hollow body 11 via the upper cover 12. Alternatively, the gas compartment 40 is provided on a bottom of the lower cover 13. The gas compartment 40 communicates with the hollow body 11 via the lower cover 13.

Figure 17:
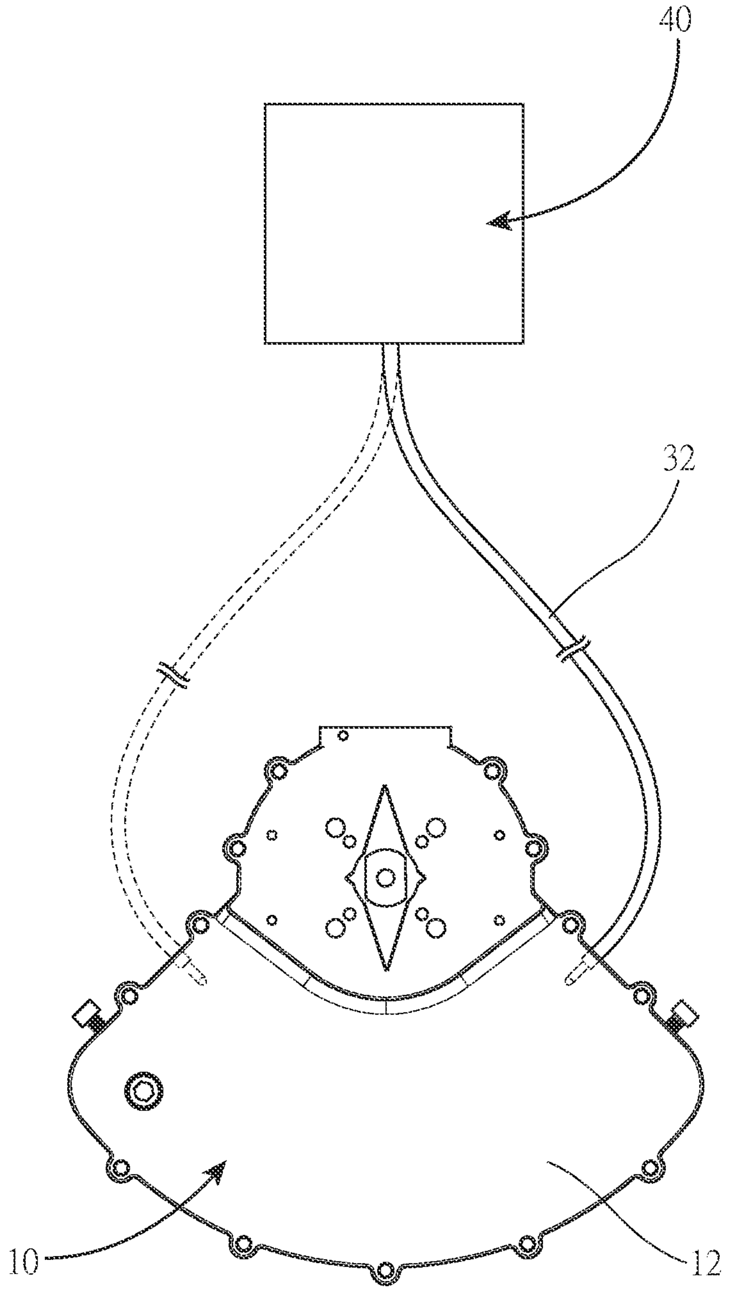
FIG. 17 is a top plan view of a pneumatic cylinder according to a fourth preferred embodiment of the invention, showing a gas compartment disposed externally and connected to the housing via a tube.

Referring to FIG. 17, a pneumatic cylinder in accordance with a fourth preferred embodiment of the invention is shown. The characteristics of the fourth preferred embodiment are substantially the same as that of the second preferred embodiment except the following: the gas compartment 40 is separated from the housing 10 and communicates with the housing 10 via a tube 32.

As shown in FIGS. 2-6, 15 and 16 specifically, an electromagnetic valve 50 is provided at an end of the housing 10 or at an end of the gas compartment 40. The electromagnetic valve 50 includes two second openings 51 communicating with the opening members 118 respectively. The electromagnetic valve 50 may control the flow of the pressurized gas through one of the second openings 51 to clockwise or counterclockwise rotate the blade 22 about the drive shaft 21. After finishing the gas input, the pressurized gas in the gas compartment 40 may exert a reaction force on the blade 22 to push the blade 22 to its original position.

The invention has the following advantages and benefits in comparison with the conventional art: For increasing space of the housing 10, only length of the hollow body 11 is changed and shapes and sizes of the upper cover 12 and the lower cover 13 are not changed. Production is made easy. Manufacturing cost is decreased. It is applicable to either fail-safe cylinder (FSC) or double-acting cylinder (DAC).

While the invention has been described in terms of preferred embodiments, those skilled in the art will recognize that the invention can be practiced with modifications and these modifications are contemplated by the invention.

What is claimed is:

1. A pneumatic cylinder, comprising:

a housing comprising a hollow body, an upper cover, and a lower cover, the hollow body including a first part having a fan-shaped cross-section and a side wall, a second part having a half circular section and a side wall, a first compartment on an upper portion, and a second compartment on a lower portion, the first compartment and the second compartment communicating with each other and having the same shape, the upper cover and the lower cover being disposed on the first compartment and the second compartment, thereby forming an activation chamber in the hollow body, the activation chamber including a first activation space in the first part and a second activation space in the second part, the first activation space communicating with the second activation space, the upper cover including a first through hole, and the lower cover including a second through hole aligned with the first through hole;

a rotor disposed in the activation chamber and including a drive shaft having two ends rotatably disposed in the first through hole and the second through hole respectively, and a blade secured to the drive shaft, the blade being configured to rotate about a drive shaft axis in the activation chamber, the drive shaft being configured to divide the blade into a first section and a second section having a length less than a length of the first section so that the first and second sections are not symmetrical by the division of the drive shaft, the first section is configured to rotate in the first activation space, the second section is configured to rotate in the second activation space, and a plurality of segments are formed on an inner surface of the hollow body along an axial direction of the drive shaft and the segments have the same shape and size; and two first openings disposed on two sides of the housing respectively so that pressurized gas is configured to pass through one of the first openings into the hollow body to clockwise or counterclockwise rotate the blade about the drive shaft axis prior to exiting from another one of the first openings;

a gas compartment integrally connected to a side of the housing, the upper cover and the lower cover extend integrally to the gas compartment and form an upper cover and a lower cover of the gas compartment, the gas compartment configured to communicate with the housing via a first channel and a second channel, wherein the gas compartment surrounds the side wall of the second part of the housing and a portion of the side wall of the first part of the housing;

a flat surface on a bottom of the upper cover of the housing and on a top of the lower cover of the housing respectively, the flat surfaces corresponding to the rotor; and a seal disposed around the blade to prevent pressurized gas from leaking.

2. The pneumatic cylinder of claim 1, wherein one of the first openings is disposed on a bottom of the upper cover and another one of the first openings is disposed on a top of the lower cover, and the gas compartment includes two opening members, one of the opening members may communicate with one of the first openings via the first channel and the other opening member may communicate with another one of the first openings via the second channel.

3. The pneumatic cylinder of claim 2, further comprising an electromagnetic valve disposed at an end of the gas compartment, the electromagnetic valve including two second openings communicating with the opening members respectively.

4. The pneumatic cylinder of claim 3, wherein the gas compartment is positioned between the electromagnetic valve and the second part of the housing.

5. The pneumatic cylinder of claim 1, wherein the first part of the hollow body includes a first arc surface and two side surfaces integrally formed at two ends of the first arc surface respectively, the second part of the hollow body includes a second arc surface having a width less than a width of the first arc surface, the first arc surface is opposite to the second arc surface, and the first and second arc surfaces are convex.

6. The pneumatic cylinder of claim 1, the rotor is disposed in the activation chamber and is configured to rotate at an angle between 30 degrees and 180 degrees in the activation chamber.

* * * * *